F. M. WELLS.
AUTOMATIC RELEASING DEVICE.
APPLICATION FILED JUNE 29, 1909.
936,202.
Patented Oct. 5, 1909.
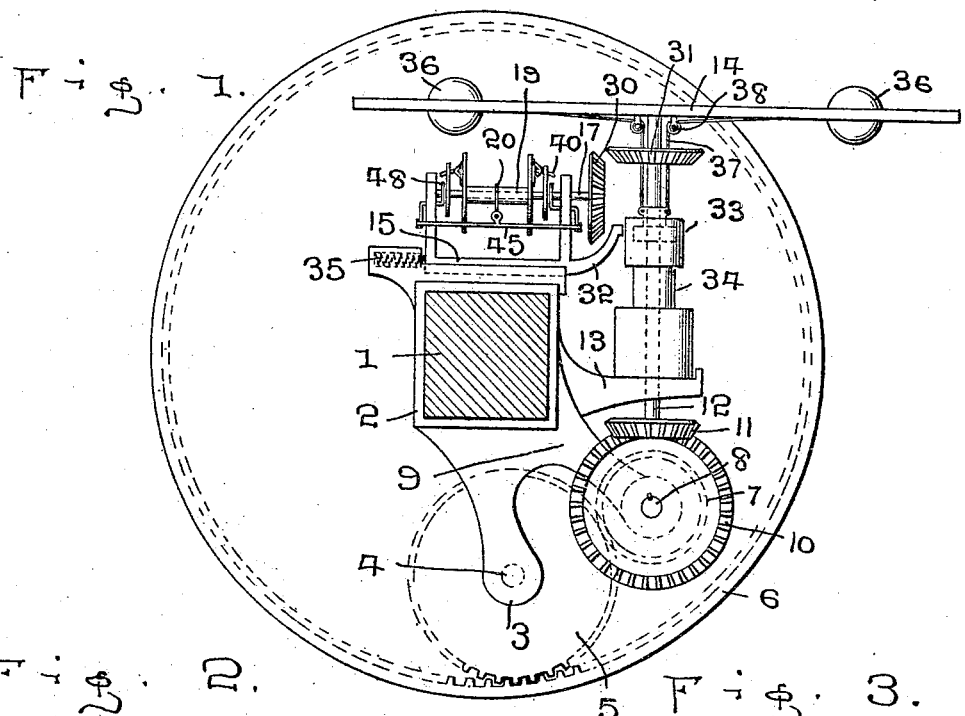
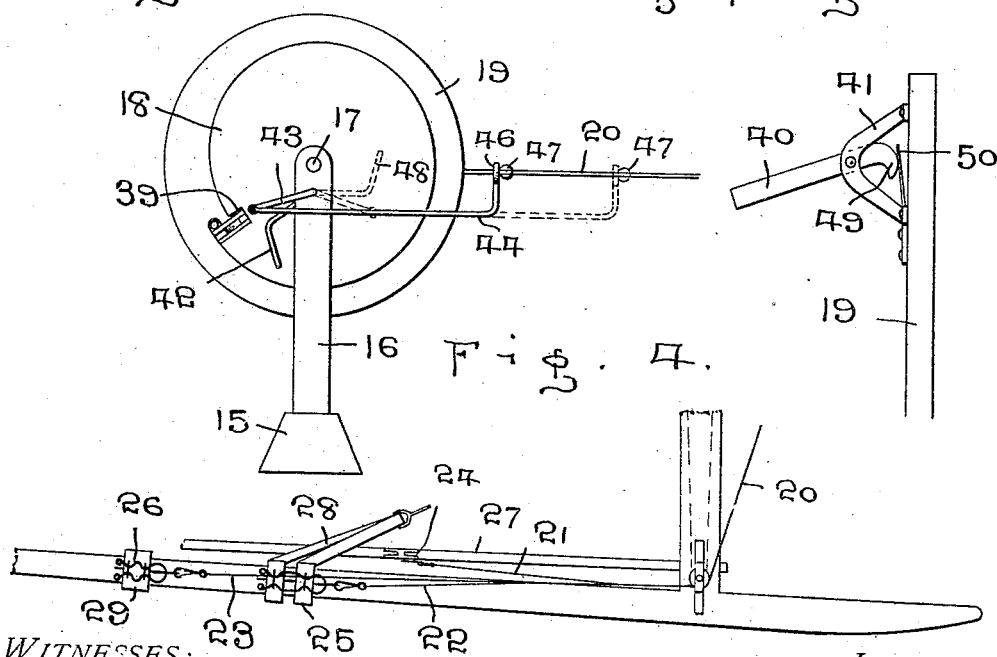
WITNESSES:
Thomas Riley
M. A. Newcomb
INVENTOR
F. M. Wells
BY
W. J. Fitzgerald & Co.
Attorneys

UNITED STATES PATENT OFFICE.

FRANCIS M. WELLS, OF FORT ROBINSON, NEBRASKA.

AUTOMATIC RELEASING DEVICE.

936,202.

Specification of Letters Patent.　　Patented Oct. 5, 1909.

Application filed June 29, 1909. Serial No. 504,988.

*To all whom it may concern:*

Be it known that I, FRANCIS M. WELLS, a citizen of the United States, residing at Fort Robinson, in the county of Dawes and State of Nebraska, have invented certain new and useful Improvements in Automatic Releasing Devices; and I do hereby declare the following to be a full, clear, and exact description of the invention, such as will enable others skilled in the art to which it appertains to make and use the same.

My invention relates to new and useful improvements in automatic releasing devices and more particularly to that class adapted to be used in releasing draft animals from a vehicle and my object is to provide means for automatically releasing the animal from the vehicle when a certain speed is reached.

A further object is to provide means for releasing the fastenings of the harness from parts of the vehicle.

A still further object is to provide means for automatically stopping the operation of the harness releasing parts and a still further object is to provide means for imparting movement to the releasing device through the medium of parts of the vehicle.

Other objects and advantages will be hereinafter referred to and more particularly pointed out in the claims.

In the accompanying drawings forming part of this application, Figure 1 is an elevation of my improved releasing device. Fig. 2 is an elevation of the mechanism for releasing the harness attachments. Fig. 3 is an edge elevation of a portion of one of the reels employed in connection with the harness releasing device, showing a latch thereon for coöperation with the second reel, and, Fig. 4 is a plan view showing a portion of a shaft and cross bar with the harness releasing mechanism applied thereto.

Referring to the drawings in which similar reference numerals designate corresponding parts throughout the several views, 1 indicates the axle of a vehicle upon which is mounted a frame 2, said frame being fixed in any suitable manner on the axle.

Depending from the frame 2 is an ear 3, in which is rotatably mounted a shaft 4 and on said shaft is located a pinion 5, which is adapted to mesh with a driving gear 6, said driving gear being attached to the hub of one of the wheels of the vehicle and it will be readily seen that as said driving wheel is rotated, the pinion 5 will be likewise rotated.

The pinion 5 in turn meshes with the pinion 7 on a shaft 8, said shaft being rotatably mounted in auxiliary ears 9 extending from the frame 2, said shaft also having a bevel gear 10 fixed thereon, which meshes with a bevel pinion 11 on the lower end of a shaft 12.

The shaft 12 extends vertically through a bracket 13 and has at its upper end a cross arm 14, which cross arm is adapted to rotate with the shaft and form a governor for the shaft.

Slidably mounted on the upper ends of the frame 2 is an auxiliary frame 15, the standards 16 at each end thereof having rotatably mounted thereon a shaft 17, to which are attached disks 18, said disks being adjacent the standards, while between said disks is a drum 19, upon which is to be wound a releasing cable 20.

One end of the cable 20 is fixed to the drum 19, while the opposite end thereof is extended to the parts of the vehicle to which the animal is attached, the cable at this point being divided into sections 21, 22 and 23, respectively, which sections extend into engagement with securing devices 24, 25 and 26, the securing device 24 being designed to hold the sections of the tug 27 together, while the securing device 25 is employed for holding the back straps 28 in engagement with the shafts and the securing device 26 to hold the supporting loops 29 in engagement with the shafts and the securing devices 24, 25 and 26 are so arranged that when the sections attached thereto are moved longitudinally the various parts of the harness to which they are attached, will be released and the animal entirely disconnected from the vehicle, but said devices are also so arranged as to securely hold the parts of the harness until the winding mechanism is operated to release the same.

One end of the shaft 17 is provided with a bevel gear 30, which is adapted to mesh with a similar gear 31 on the shaft 12, whereby when the gear is in mesh with the gear 31, the drum 19 will be rotated and the cable wound thereon, but the gear 30 is normally held out of engagement with the gear 31 by means of a finger 32, which finger is positioned at one end of the auxiliary frame 15 and has its outer end extended upwardly and in position to engage a sleeve 33 on the shaft 12, the periphery of the upper end of said sleeve being such as to hold the bevel gear 30 out of engagement with the bevel gear 31, but said sleeve is provided with a circumferential channel 34, into which the free end of the finger 32 is adapted to move when the sleeve has been elevated a sufficient distance to bring the channel in alinement with the upper end of the finger and when so positioned, the auxiliary frame and parts carried thereby will be moved toward the gear 31 by means of a spring 35, the tension of said spring being sufficient to hold the gear in mesh with the gear 31 to perform the winding operation.

The movement of the sleeve 33 is regulated by means of weights 36, which weights are slidably mounted in any preferred manner on the cross arms 14, one at each side of the shaft 12 and are connected to the sleeve 33 by means of cables 37, which cables extend over sheaves 38 carried by the cross arm 14, thence downwardly and into engagement with the upper end of the sleeve and it will be readily seen that as the speed of the shaft 12 is increased, the weights 36 will move by momentum toward the outer ends of the cross arm, thereby raising the sleeve 33 until the channel 34 is reached, when the finger 32 will be moved into the channel, this bringing the bevel gear 30 into engagement with the bevel gear 31, whereupon the shaft 17 and parts attached thereto will be rotated and the cable wound upon the drum 19, said winding action causing the sections at the outer end of the cable to release the various retaining parts of the harness and free the animal from the vehicle.

As the vehicle will move some distance after the animal is released therefrom, I have provided means for stopping the winding of the cable onto the drum as soon as the animal is released, which consists of providing a notch 39 in the disk 18, with which is adapted to engage a latch 40 carried by the drum 19, said arms being pivotally mounted in brackets 41 which brackets are in position to extend the free ends of the latches over the edges of the disks 18, whereby they will drop into the notches as soon as they come in registration therewith and it will be readily seen that as long as the latches remain in engagement with the notches, the drum 19 will be caused to rotate with the shaft 17.

The latches 40 are released from the notches 39 by means of arms 42, which are pivotally mounted in the standards 16, said arms being so arranged as to extend in the path of the projecting ends of the latches and raising the same a sufficient distance to clear the notches 39 and when so raised the latches will slide on the periphery of the disk 18 and permit the drum 19 to remain stationary, the peripheries of the disks being eccentric to the shaft 17, to facilitate the releasing of the latches.

The arms 42 are provided with cranks 43, to the free ends of which are secured pitmen 44, said pitmen being connected together by means of a cross rod 45, said rod being provided at its longitudinal center with an eye 46, through which the cable 20 passes and by placing a ball or the like 47 on the cable and in position to engage the outer face of the eye, the inward movement of the cable will cause the pitmen to swing the arms 42 from the position shown by dotted lines 48 in Fig. 2, to the position shown by full lines in said figure, thereby bringing the arms in position to throw the latches out of engagement with the notches and said latches are held from casually dropping into or out of the notches by providing a curved face 49 at the inner end of the latches against which is adapted to press a spring 50, the tension of said spring being such as to normally hold the latches against casual swinging movement.

The various gears employed for rotating the shaft 12 are so spaced that under ordinary circumstances, the rotation of the shaft will not affect or materially elevate the sleeve 33, but should the animal travel at a faster gait or a dangerous speed, the weights 36 will move outwardly and elevate the sleeve, whereupon the spring 35 will force the auxiliary frame and parts carried thereby toward the shaft 12 and move the finger into the channel 34, thereby bringing the gear 30 into engagement with the gear 31, whereupon the cable 20 will be immediately wound upon the drum 19 and the animal released from the vehicle, this operation causing the ball 47 to engage the eye 46 and swing the arms 42 on their pivots. This movement is such as to bring the arms into the path of the latches 40, simultaneously with the releasing of the animal, thus stopping the winding movement of the cable and as soon as the animal is released from the vehicle, the momentum of the vehicle will be checked to such an extent as to cause the sleeve to descend and engage the finger 32 and as the sleeve is of considerable weight, said sleeve will act as a brake to check the motion of the vehicle.

After the vehicle has been stopped, the auxiliary frame 15 is again moved to its forward position and the sleeve permitted to descend, after which the cable is unwound from the drum and the securing devices placed in position to engage the parts of the harness, when the latches are lowered into engagement with the notches in the disk, thus placing the device in position to again release the animal when a certain speed has been attained.

The various sections of the cable 20 are removably attached to the securing devices as by means of snap hooks so that said sections can be readily released from the parts of the harness when it is desired to unhitch the animal in the usual way.

What I claim is:—

1. In a releasing device, the combination with parts of a vehicle; of a frame attached to said vehicle, a driving gear fixed to a rotating portion of the vehicle, a releasing cable, a winding drum to which said cable is attached and means interposed between the driving gear and said drum to operate said drum when the vehicle has attained a predetermined speed of travel, said means being controlled by the movement of the vehicle.

2. In a releasing device, the combination with parts of a vehicle and means to attach parts of a harness to the vehicle; of a releasing cable for the parts of the harness attached to the vehicle, a winding drum for said cable, means to automatically stop the rotation of the drum and additional means to rotate said drum when the vehicle has attained a predetermined speed, said rotated means being controlled by the movement of the vehicle.

3. A releasing device comprising the combination with parts of a vehicle, a frame mounted on the vehicle, an auxiliary frame movably mounted thereon, a releasing cable, a drum upon which said cable is adapted to be wound, means to automatically stop the rotation of the drum and additional means controlled by the movement of the vehicle to operate said drum.

4. In a releasing device, the combination with parts of a vehicle; of a drum, a releasing cable attached to said drum and adapted to be wound thereon, a shaft, gearing connecting said shaft with the drum, means to impart rotating movement to the shaft and additional means to cause said drum to rotate when the speed of the vehicle has attained a predetermined degree, said rotated means being controlled by the movement of the vehicle.

5. In a releasing device, the combination with parts of a vehicle; of a frame mounted on the vehicle, an auxiliary frame movably mounted on the first mentioned frame, a shaft carried by the auxiliary frame, a drum rotatably mounted on said shaft, means to cause the drum to rotate with the shaft, a releasing cable attached to said drum and adapted to be wound thereon, means to automatically release the drum from said shaft, a gear at one end of the shaft, an additional shaft, means to rotate the last mentioned shaft, a gear adapted to mesh with the gear on the first mentioned shaft and means controlled by the movement of the vehicle to bring said gears in mesh with each other.

6. In a releasing device, the combination with parts of a vehicle, and means to attach portions of harness thereto; of a drum, a shaft supporting said drum, a releasing cable attached at one end to the drum and at its opposite end to the securing devices for the parts of the harness, disks fixed to said shaft and having notches therein, latches carried by the drum adapted to engage said notches and cause the drum to rotate with the shafts, means for automatically releasing the latches from the notches, whereby the rotation of the drum will be stopped and driving means for said shaft.

7. In a releasing device, the combination with parts of a vehicle, a releasing cable, a winding drum on said cable, a shaft on which the drum is mounted, means to cause the drum to rotate with the shaft an additional means to move said shaft and drum lengthwise; of an additional shaft, a sleeve movably mounted on said second-mentioned shaft, means to elevate said sleeve and permit the drum and its shaft to move toward the second mentioned shaft and gears carried by said shafts adapted to be brought into mesh with each other and impart motion to the drum.

8. In a releasing device, the combination with parts of a vehicle, a frame attached thereto, an auxiliary frame laterally movable on the first mentioned frame, a finger carried by said auxiliary frame, a shaft carried by said auxiliary frame, a drum on said shaft, a cable attached to said drum, means to cause the drum to rotate with the shaft and a gear on said shaft; of an additional shaft, means to rotate the second mentioned shaft, a sleeve slidably mounted on said second mentioned shaft and adapted to be engaged by said finger, a gear on the second mentioned shaft adapted to mesh with the gear on the first-mentioned shaft, when the auxiliary frame is moved toward the second mentioned shaft and means controlled by the speed of the vehicle adapted to raise said sleeve and permit the auxiliary frame to move toward the second mentioned shaft.

In testimony whereof I have signed my name to this specification in the presence of two subscribing witnesses.

FRANCIS M. WELLS.

Witnesses:
ELLWOOD W. EVANS,
A. H. SCHNEIDER.